(12) United States Patent
Iwata (10) Patent No.: US 11,124,260 B2
(45) Date of Patent: Sep. 21, 2021

(54) SADDLE TYPE VEHICLE

(71) Applicant: KAWASAKI JUKOGYO KABUSHIKI KAISHA, Kobe (JP)

(72) Inventor: Shigeyuki Iwata, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 251 days.

(21) Appl. No.: 16/205,592

(22) Filed: Nov. 30, 2018

(65) Prior Publication Data

US 2019/0176924 A1 Jun. 13, 2019

(30) Foreign Application Priority Data

Dec. 8, 2017 (JP) .............................. JP2017-236035

(51) Int. Cl.
*B62K 19/40* (2006.01)
*B62K 25/20* (2006.01)
(Continued)

(52) U.S. Cl.
CPC ................. *B62K 19/40* (2013.01); *B62J 9/40* (2020.02); *B62K 11/04* (2013.01); *B62K 25/20* (2013.01);
(Continued)

(58) Field of Classification Search
CPC ........ B62K 19/40; B62K 11/02; B62K 11/04; B62K 19/46; B62J 9/40; B62J 11/22;
(Continued)

(56) References Cited

U.S. PATENT DOCUMENTS 1,079,286 A * 11/1913 Braidwood ................ B62J 9/00
224/435
3,779,597 A * 12/1973 Uchida .................... B62J 11/24
296/37.15
(Continued)

FOREIGN PATENT DOCUMENTS

CN 204956748 U 1/2016
EP 0602590 A1 * 6/1994 .............. B62J 15/00
(Continued)

*Primary Examiner* — Anne Marie M Boehler
(74) *Attorney, Agent, or Firm* — Fay Kaplun & Marcin, LLP (57) ABSTRACT

A saddle type vehicle (e.g., a motorcycle) includes first, second, and third frames and a storage member. The second frame is connected to the first frame and extends rearward from a connecting position between the second and first frames. A seat is fixed to the second frame. The third frame is connected to the first frame at a position lower than the connecting position between the second and first frames, extends rearward from the connecting position between the third and first frames, and then connected to the second frame. The storage member includes a first storage portion storing a battery and a second storage portion storing a tool casing and which is positioned below the first storage portion. In the side view, the first and second storage portions are arranged in an internal space surrounded by the first, second, and third frames. The first and second storage portions are arranged side by side in a vertical direction.

14 Claims, 6 Drawing Sheets

(51) Int. Cl.
*B62J 9/40* (2020.01)
*B62J 43/00* (2020.01)
*B62K 11/04* (2006.01)
*B62K 25/04* (2006.01)

(52) U.S. Cl.
CPC ......... *B62J 43/00* (2020.02); *B62K 2025/048* (2013.01)

(58) Field of Classification Search
CPC ..... B62J 43/20; B62J 43/30; B62J 9/00; B62J 9/23; B62J 9/10
USPC .......................................... 180/219; 224/413
See application file for complete search history.

(56) References Cited

U.S. PATENT DOCUMENTS

| | | | | |
|---|---|---|---|---|
| 5,040,632 | A * | 8/1991 | Fujii | B62K 19/46 180/219 |
| 5,249,721 | A * | 10/1993 | Brooks | B62J 9/22 224/426 |
| 6,318,743 | B1 * | 11/2001 | Nakashima | B62J 15/00 180/219 |
| 7,794,002 | B2 * | 9/2010 | Yano | B62K 19/46 296/37.15 |
| 8,864,157 | B2 * | 10/2014 | Tsutsui | B62K 11/04 280/152.1 |
| 2006/0061157 | A1 * | 3/2006 | Yokomizo | B62J 1/12 297/214 |
| 2011/0232987 | A1 * | 9/2011 | Chipp | B62K 19/36 180/311 |
| 2016/0288860 | A1 * | 10/2016 | Tani | B62K 11/04 |
| 2017/0101151 | A1 * | 4/2017 | Koishikawa | B62K 11/04 |
| 2017/0284347 | A1 * | 10/2017 | Ozaki | B62K 19/30 |
| 2018/0339745 | A1 * | 11/2018 | Nakamura | B60T 8/3685 |
| 2019/0077483 | A1 * | 3/2019 | Futamata | B62M 7/02 |

FOREIGN PATENT DOCUMENTS

| | | | | |
|---|---|---|---|---|
| EP | 2281737 | A2 * | 2/2011 | ............ B62K 11/04 |
| JP | S5868388 | U | 5/1983 | |
| JP | S63141093 | U | 9/1988 | |
| JP | H0592782 | A | 4/1993 | |
| JP | H1159545 | A | 3/1999 | |
| JP | 2002211465 | A | 7/2002 | |
| JP | 2003200871 | A | 7/2003 | |
| JP | 2011031818 | A | 2/2011 | |
| JP | 2016179793 | | 10/2016 | |
| JP | H6183383 | B2 | 8/2017 | |
| JP | 2017213985 | A | 12/2017 | |

* cited by examiner

SADDLE TYPE VEHICLE

FIELD OF THE INVENTION

The present invention relates to a saddle type vehicle.

DESCRIPTION OF THE RELATED ART

A saddle type vehicle that is provided with a storage member for storing a battery and tools inside a side cover, has been conventionally known. Japanese Patent Application Laid-Open No. 2016-179793 discloses this kind of configuration.

Japanese Patent Application Laid-Open No. 2016-179793 discloses a storage casing having a first storage portion that is arranged forward of a sub seat frame, a second storage portion that is arranged rearward of the sub seat frame, and a frame crossing part which connects the first storage portion and the second storage portion while crossing the sub seat frame from the outside in a vehicle width direction.

The first storage portion is covered with a rear side cover. The second storage portion is covered with a rear side lower cover.

SUMMARY OF INVENTION

In a configuration disclosed in Japanese Patent Application Laid-Open No. 2016-179793, the storage casing extends long in a front-back direction across the sub seat frame and has a plurality of side covers. As a result, the storage casing cannot be compactly arranged, and it is difficult to efficiently utilize a space inside a vehicle. There is room for improvement.

The present invention relates to a saddle type vehicle which efficiently utilizes a space inside a vehicle with a compact layout.

According to an aspect of the present invention, a saddle type vehicle with the following configuration is provided. That is, the saddle type vehicle includes a first frame, a second frame, a third frame, and a storage member. The second frame is connected to the first frame, and extends rearward from a connecting position between the second frame and the first frame. The third frame is connected to the first frame at a position lower than the connecting position between the second frame and the first frame, extends rearward from the connecting position between the third frame and the first frame, and then connected to the second frame.

The storage member is fixed to at least one of the first frame, the second frame, and the third frame. A seat on which the driver sits, is fixed to the second frame. The storage member includes a first storage portion and a second storage portion. The first storage portion can store a battery. The second storage portion is positioned below the first storage portion, and can store an article other than the battery. In a side view, the first storage portion and the second storage portion are arranged in an internal area surrounded by the first frame, the second frame, and the third frame. The first storage portion and the second storage portion are arranged side by side in a vertical direction.

Accordingly, the storage portion for the battery and the storage portion for the article other than the battery are compactly arranged, which can efficiently utilize an internal space of frames. Since the plurality of storage portions are integrated, they can be easily attached to the frames.

According to the invention, a saddle type vehicle which efficiently utilizes a space inside the vehicle with a compact layout.

DETAILED DESCRIPTION

Next, an embodiment of the present invention will be described with reference to the drawings. In the following description, "front", "back", "left", "right", "up", and "down" mean directions as seen from a driver who straddles a motorcycle.

Figure 1:
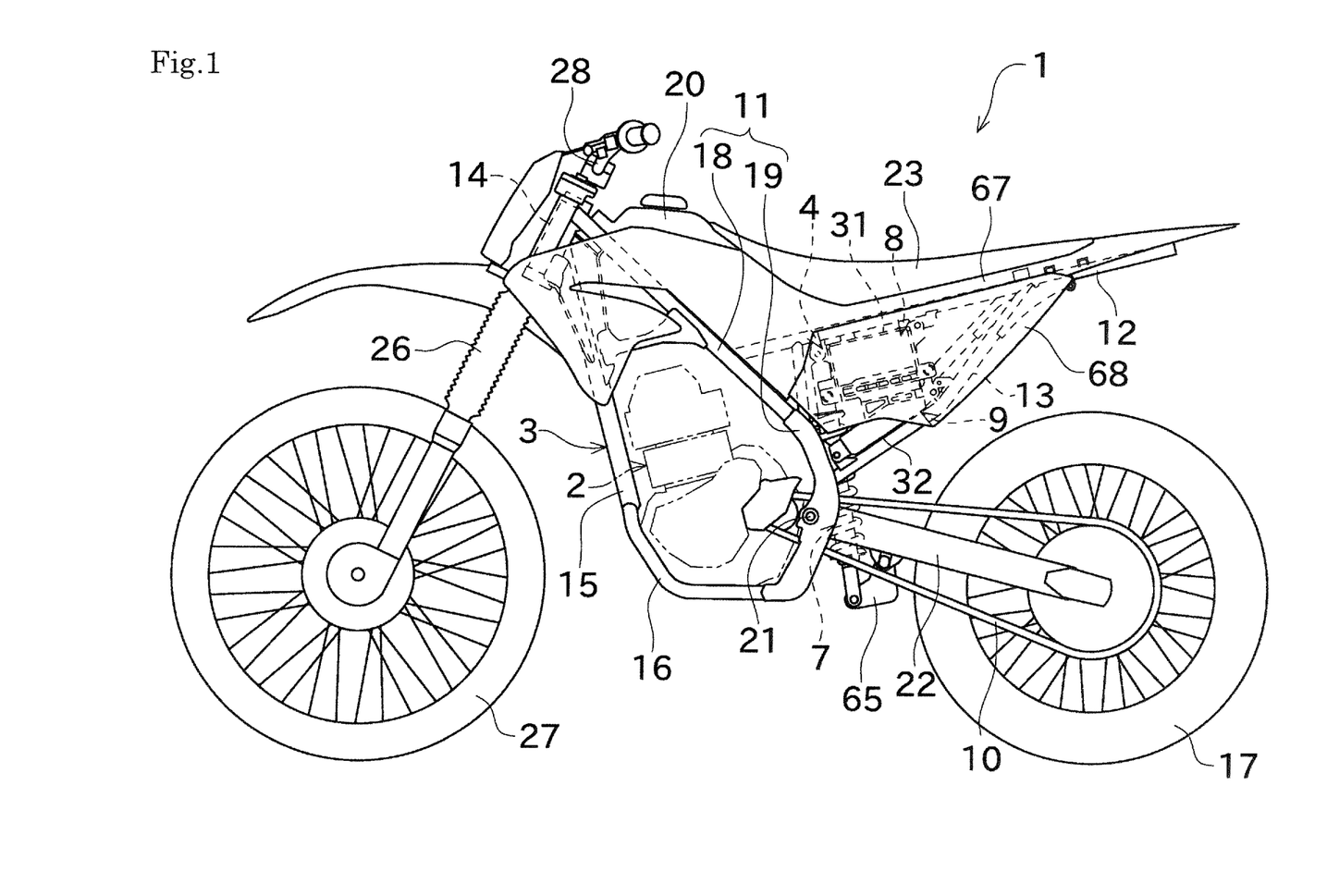
FIG. 1 is a side view showing a motorcycle according to an embodiment of the present invention.
Figure 2:
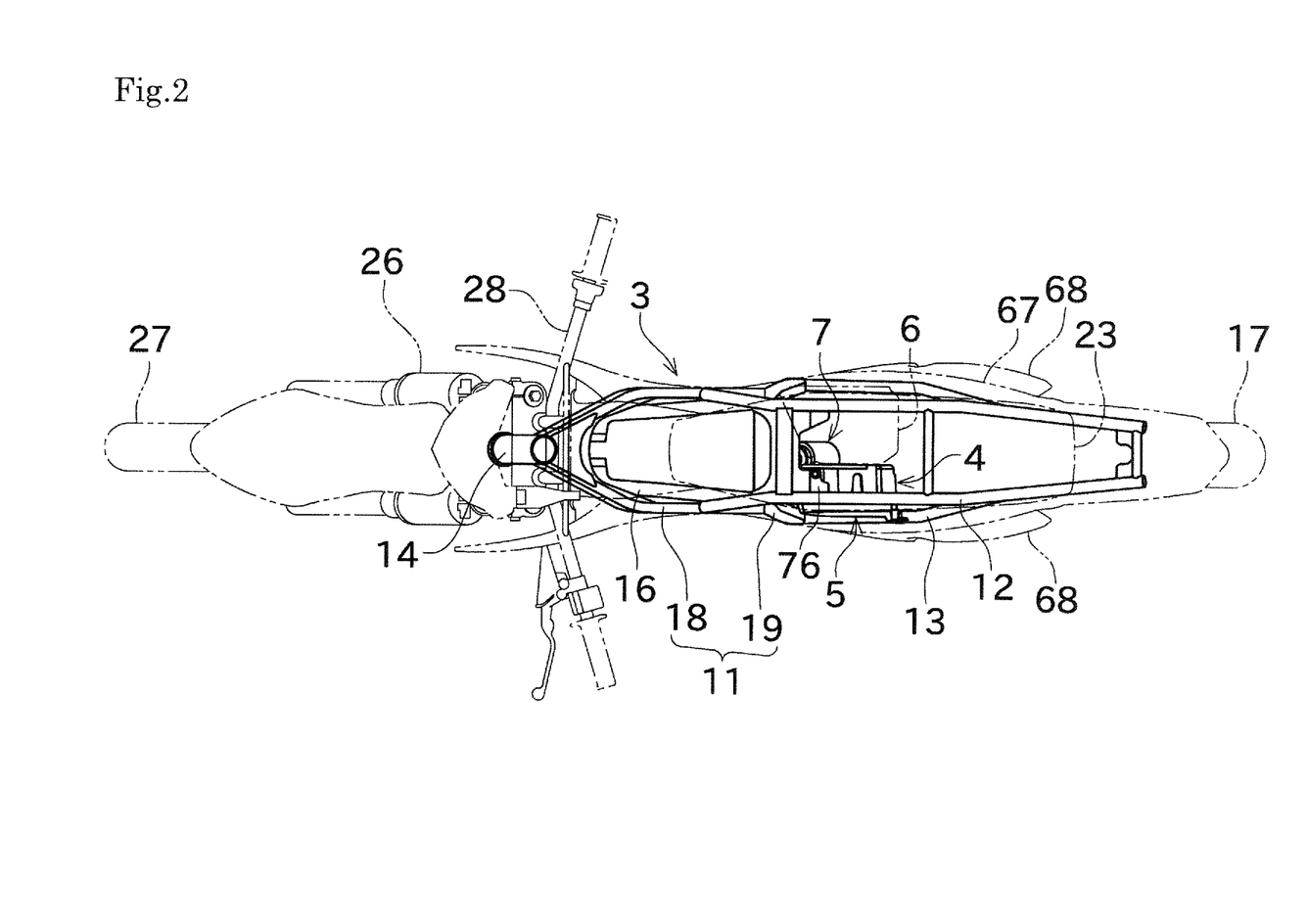
FIG. 2 is a plan view transparently showing positions of an air cleaner, a storage member, and a suspension, etc., in relation to a vehicle body frame in the motorcycle.
Figure 3:
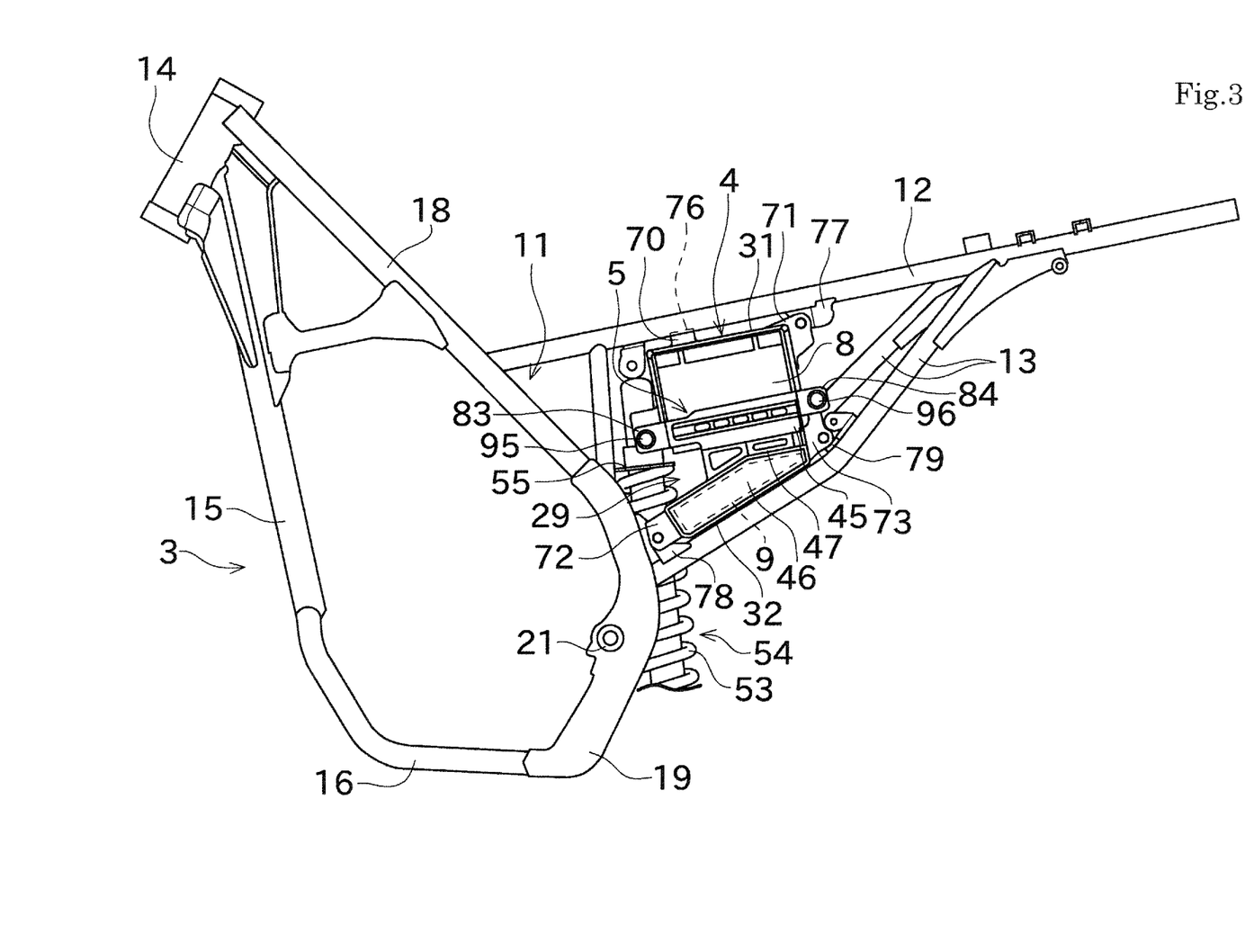
FIG. 3 is a side view showing the suspension, the storage member, and a restricting member which are attached to the vehicle body frame.
Figure 4:
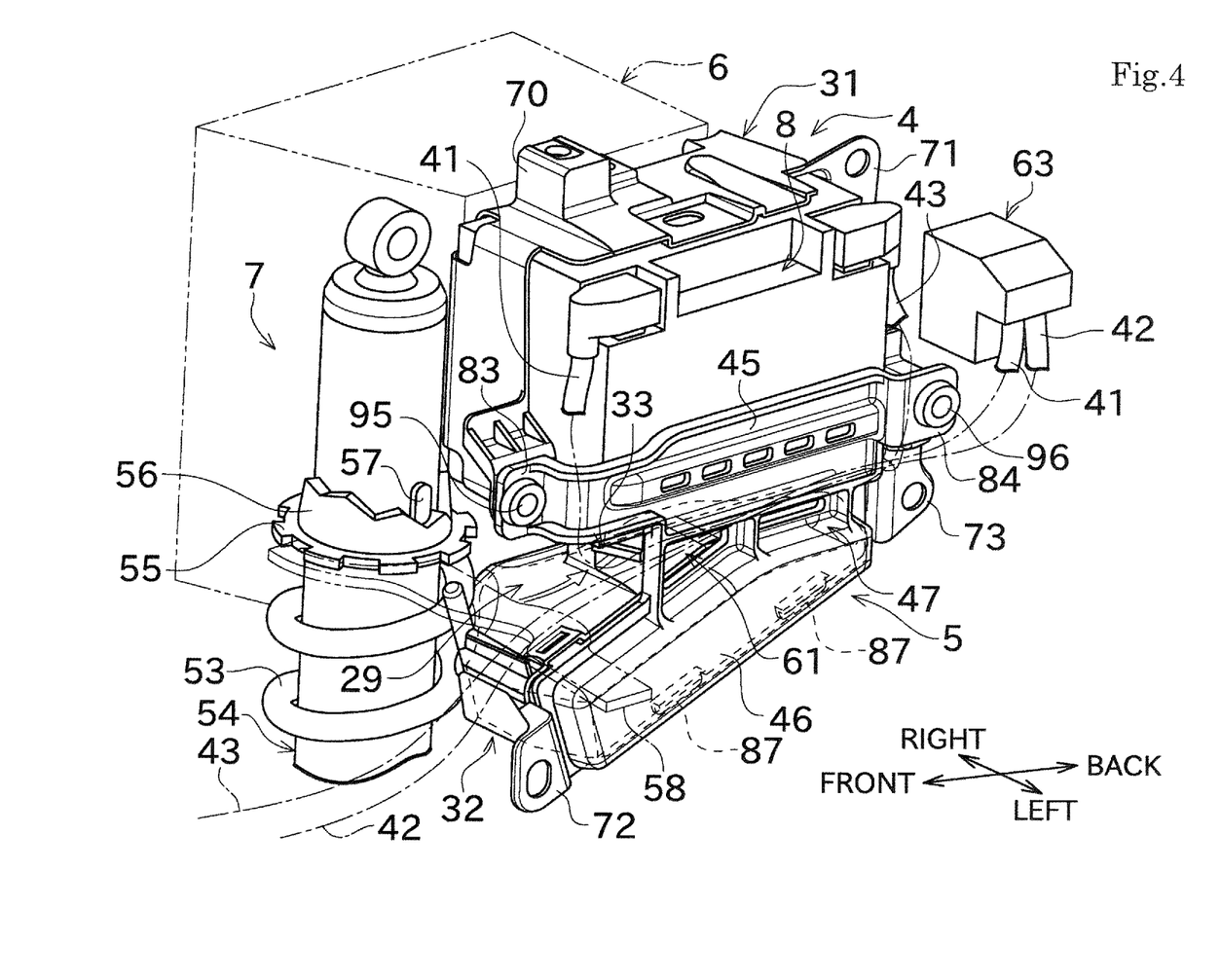
FIG. 4 is an enlarged perspective view showing the suspension, the storage member, and the restricting member.
Figure 5:
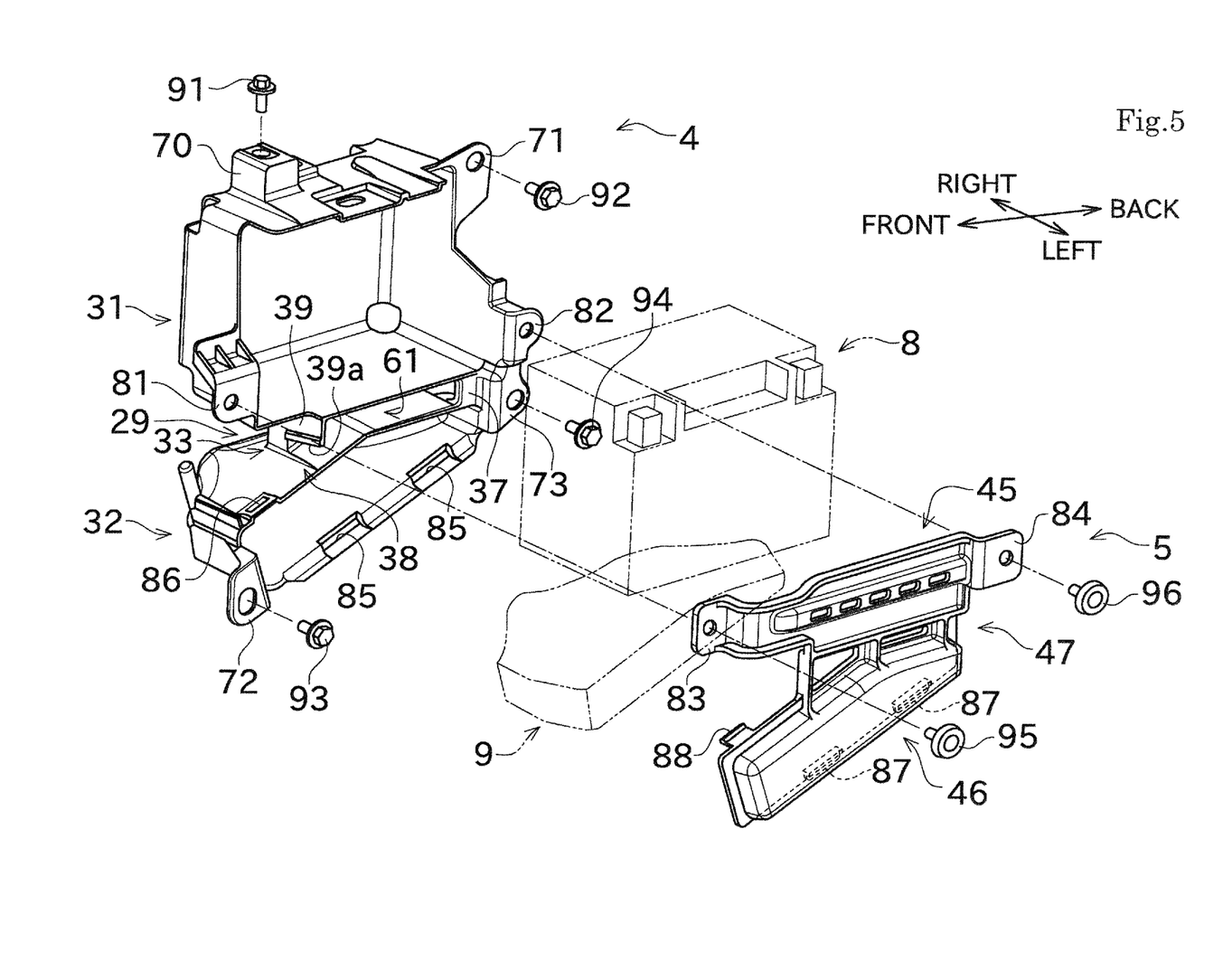
FIG. 5 is an exploded perspective view showing an assembling of the storage member and the restricting member.
Figure 6:
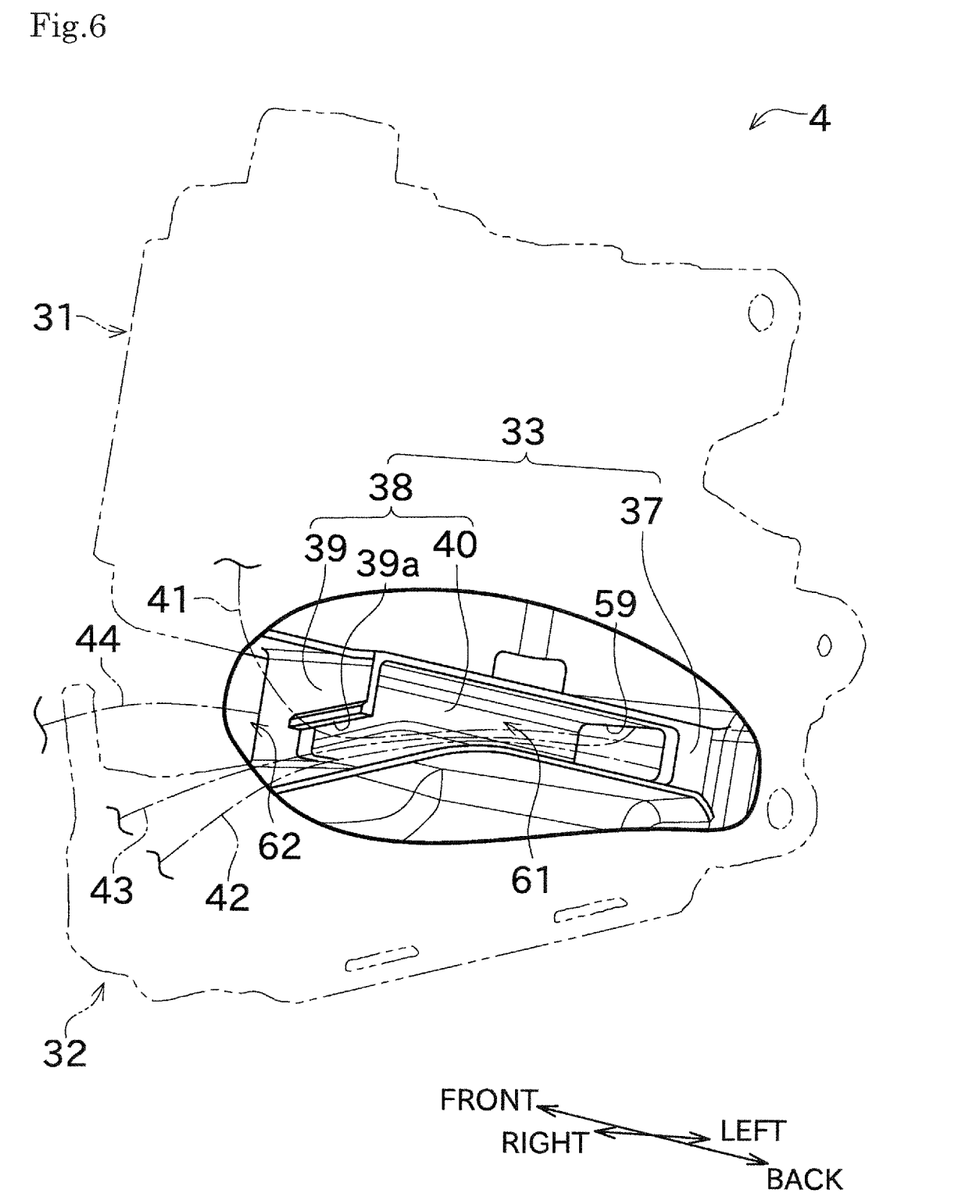
FIG. 6 is a partial perspective view detailedly showing a configuration of a first coupling part and a second coupling part included in the storage member.

FIG. 1 is a side view showing a motorcycle 1 according to one embodiment of the present invention. FIG. 2 is a plan view transparently showing positions of an air cleaner 6, a storage member 4, and a suspension 7, etc., in relation to a vehicle body frame 3 in the motorcycle 1. FIG. 3 is a side view showing the suspension 7, the storage member 4, and a restricting member 5 which are attached to the vehicle body frame 3. FIG. 4 is an enlarged perspective view showing the suspension 7, the storage member 4, and the restricting member 5. FIG. 5 is an exploded perspective view showing an assembling of the storage member 4 and the restricting member 5. FIG. 6 is a partial perspective view detailedly showing a configuration of a first coupling part 37 and a second coupling part 38 included in the storage member 4.

The motorcycle (saddle type vehicle) 1 shown in FIG. 1 and FIG. 2 is configured as an off-road motorcycle supposed to drive on unpaved road, unleveled sand, etc. The motorcycle 1 includes an engine 2, the vehicle body frame 3, the air cleaner 6, and the suspension 7.

The engine 2 shown in FIG. 1 is configured as, for example, a gasoline engine, and functions as a drive source for driving the motorcycle 1. The vehicle body frame 3 forms a framework of the motorcycle 1 and supports the engine 2 and the like. The air cleaner 6 shown in FIG. 2 catches and removes dust and dirt in the air that is supplied to the engine 2. The suspension 7 absorbs shock applied from a road surface while maintaining a vehicle body posture (vehicle height).

The engine 2 includes a cylinder for storing a piston and a crankcase for storing a crankshaft, a transmission gear, and the like. A driving force generated in the engine 2 is shifted by the transmission gear and transmitted to a rear wheel 17 via a drive chain 10.

The vehicle body frame 3 is made of a plurality of metal pipes connected by welding or the like. As shown in FIG. 3, the vehicle body frame 3 includes a first frame 11, a second frame 12, a third frame 13, a head pipe 14, a down frame 15, and a lower frame 16. The storage member 4 for storing a battery 8 and a tool casing 9 is attached to the vehicle body frame 3.

The first frame 11 includes an upper frame 18 and a bottom frame 19. The upper frame 18 is connected to the head pipe 14 and extends rearward and obliquely downward from the head pipe 14. The bottom frame 19 is connected to a lower end side of the upper frame 18 and extends downward from a connecting position between the bottom frame 19 and the upper frame 18.

The upper frame 18 supports a fuel tank 20 and the like arranged on a rear side of the head pipe 14 as shown in FIG. 1. The bottom frame 19 includes a pivot shaft 21. As shown in FIG. 1, a front end of a swing arm 22 is connected to the pivot shaft 21. Therefore, the swing arm 22 can swing, around the pivot shaft 21 as a rotation center, in a vertical direction with respect to the bottom frame 19. The rear wheel 17 is rotatably supported at a rear end of the swing arm 22.

The second frame 12 is connected to a substantially intermediate portion of the upper frame 18, and extends rearward from a connecting position between the second frame 12 and the upper frame 18. A seat 23 on which the driver sits is fixed to the second frame 12.

As shown in FIG. 3, the second frame 12 has a first stay 76 and a second stay 77 for fixing a first storage portion 31, which will be described later, included in the storage member 4. Each of the first stay 76 and the second stay 77 is formed in a small plate shape and fixed to the second frame 12 by welding or the like.

The third frame 13 is connected to the bottom frame 19 and extends rearward from a connecting position between the third frame 13 and the bottom frame 19. The connecting position between the third frame 13 and the bottom frame 19 is lower than the connecting position between the second frame 12 and the upper frame 18. The third frame 13 is connected to an intermediate portion in a longitudinal direction of the second frame 12. Accordingly, in a side view, a region surrounded by the first frame 11, the second frame 12, and the third frame 13 is foil ed. The storage member 4 is arranged inside such region. A space for arranging the storage member 4 and the like, is formed inside the first frame 11, the second frame 12, and the third frame 13.

The third frame 13 has a third stay 78 and a forth stay 79 for fixing a second storage portion 32, which will be described later, included in the storage member 4. Each of the third stay 78 and the fourth stay 79 is formed in a small plate shape and fixed to the third frame 13 by welding or the like.

The head pipe 14 is arranged at a front end of the vehicle body frame 3. The upper frame 18 is connected to an upper end of the head pipe 14. The down frame 15 is connected to a lower end of the head pipe 14.

The head pipe 14 rotatably supports a front fork 26 as shown in FIG. 1 and the like, via an upper bracket and an under bracket (not shown). The front fork 26 supports a front wheel 27 at the lower end via an axle. On the other hand, the upper bracket (not shown) supports a steering wheel 28 for shifting the direction of the front wheel 27 and steering the vehicle body, at the upper end.

The down frame 15 extends rearward and obliquely downward from the head pipe 14. The lower frame 16 extends in a front-back direction. A front end of the lower frame 16 is connected to a lower end of the down frame 15.

A rear end of the lower frame 16 is connected to a lower end of the bottom frame 19. Accordingly, a space for arranging the engine 2 and the like is formed inside the upper frame 18, the bottom frame 19, the down frame 15, and the lower frame 16.

The first frame 11, the second frame 12, the third frame 13, and the like are respectively provided in pairs in left and right, as shown in FIG. 2. They are arranged so as to be substantially symmetrical. An upper part of the suspension 7, the air cleaner 6, and the restricting member 5, etc. are arranged in a small space surrounded by the first frame 11, the second frame 12, and the third frame 13.

As shown in FIG. 1 and the like, a seat cowl 67 and a side cover 68 are mounted to the vehicle body frame 3 so as to cover the outside of various parts supported by the vehicle body frame 3. The seat cowl 67 is elongated back and forth so as to cover an upper part and an upper left and right sides of the vehicle body frame 3. The seat cowl 67 is integrated with the seat 23. The side cover 68 has a substantially triangular shape in a side view. The side cover 68 is arranged at a position lower than the seat cowl 67. The side cover 68 is arranged in pairs in left and right, as shown in FIG. 2. Each side cover 68 covers the left and right sides in the second frame 12 and the third frame 13 of the vehicle body frame 3.

The air cleaner 6 will be described. As shown in FIG. 2, the air cleaner 6 is arranged, in a space directly below the seat 23, especially at a slightly right position of the horizontal center of the vehicle body. The air cleaner 6 with the well-known configuration purifies air that is flowed via an air duct (not shown) and supplies such air to the engine 2. An air intake port for introducing the air into the air duct (not shown) can be opened toward a front side of the vehicle body, so as to introduce running wind, for example.

The suspension 7 will be described. As shown in FIG. 2, the suspension 7 is arranged, in the space directly below the seat 23, especially at a position of the substantially horizontal center of the vehicle body. An upper end of the suspension 7 is connected to the second frame 12, and a lower end of the suspension 7 is connected to the swing arm 22 via a link member 65. The lower end may be directly connected to the swing arm 22, not via the link member 65. As a result, as shown in FIG. 4, the upper part of the suspension 7 is arranged adjacent to the storage member 4 and the air cleaner 6, so that the upper part of the suspension 7 which is each front side of the storage member 4 and the air cleaner 6 is partly sandwiched between the storage member 4 and the air cleaner 6.

The suspension 7 includes a spring 53, a shock absorber 54, and a rotating member 55. The spring 53 functions to maintain the vehicle body posture (vehicle height) and to alleviate an impact from uneven road surface. The shock absorber 54 suppresses a sharp extension of the contracted spring 53. The rotating member 55 is arranged in contact with the spring 53 at the upper end side of the shock absorber 54. The rotating member 55 is a member for adjusting energization force (initial load) of the spring 53.

The spring 53 generates elastic force for buffering vibrations and the like transmitted to the vehicle body. The spring 53 is formed in the shape of a coil spring by the well-known spring steel material.

The shock absorber 54 is inserted in the spring 53. The upper end of the shock absorber 54 is rotatably supported by the second frame 12. The lower end of the shock absorber 54 is connected to the swing arm 22 via the link member 65 shown in FIG. 1.

As shown in FIG. 4, the rotating member 55 is a circular flange in which a plurality of cutouts are formed on the outer peripheral portion of the rotating member 55 at regular intervals. A tip of an appropriate tool (such as a wrench 58 shown by a chain line in FIG. 4) can be hooked in these cutouts. As shown in FIG. 3, in the side view, at least a part of the rotating member 55 is arranged in the internal space surrounded by the first frame 11, the second frame 12 and the third frame 13.

The rotating member 55 is fixed to a cylindrical member 56 capable of moving and rotating in an axial direction of the suspension 7. Therefore, the cylindrical member 56 rotates along with the rotating member 55. A plurality of adjusting gears arranged at different heights side by side in a circumferential direction, are formed at an upper end of the cylindrical member 56. A projection 57 capable of engaging with the adjusting gears is formed on the upper part of the suspension 7. The cylindrical member 56 is rotated along with the rotating member 55 to select the height of the adjusting gears with which the projection 57 can engage. Thereby, the initial load can be changed by shifting the positions of the rotating member 55 and the cylindrical member 56 in the axial direction, and changing a compression amount of the spring 53.

Next, the storage member 4 will be described. As shown in FIG. 2, the storage member 4 is arranged in the space directly below the seat 23, especially at a slightly left position of the horizontal center of the vehicle body. The storage member 4 is arranged adjacent to the air cleaner 6 in the left-right direction. The air cleaner 6 is arranged in the right side, and the storage member 4 is arranged in the left side, respectively. As shown in FIG. 1, in the side view, the storage member 4 is largely covered with the left side cover 68.

The storage member 4 shown in FIG. 5, etc. is configured by integrally forming a first storage portion 31, a second storage portion 32, and a connecting portion 33, made of synthetic resin. The first storage portion 31 and the second storage portion 32 are arranged side by side in the vertical direction with a predetermined gap therebetween. The connecting portion 33 is arranged in a space between the first storage portion 31 and the second storage portion 32. The connecting portion 33 connects the first storage portion 31 and the second storage portion 32.

The first storage portion 31 can store the battery 8 for supplying electric power to various electric parts of the motorcycle 1. As shown in FIG. 4 and FIG. 5, the first storage portion 31 has a hollow cuboid shape, and its left side that is far from the air cleaner 6 is opened. In the plan view, the air cleaner 6 is arranged in one side of the left-right direction. The first storage portion 31 is arranged so as to open toward the other side of the left-right direction. In this embodiment, since the air cleaner 6 is arranged in the right side, the left side of the first storage portion 31 is opened. As shown in FIG. 4, the first storage portion 31 stores the battery 8 while exposing the left side of the battery 8 where a pair of electrodes is arranged. Accordingly, electric wires 41 and 43 can be easily attached to or removed from the electrodes, in a state where the battery 8 is inserted into the first storage portion 31. As shown in FIG. 3, in the side view, an upper surface of the first storage portion 31 is arranged along the second frame 12.

As shown in FIG. 5 and the like, a fixing protrusion 70 and a first bracket 71 are integrally formed on a ceiling portion of the first storage portion 31.

The fixing protrusion 70 has a substantially cuboid shape, and protrudes upward from the upper surface of the first storage portion 31. The fixing protrusion 70 having a screw hole in the vertical direction can be fixed to the first stay 76 of the second frame 12 by using a bolt 91.

The first bracket 71 protrudes rearward and obliquely upward from the rear of the first storage portion 31. The first bracket 71 having an insertion hole in the left-right direction can be fixed to the second stay 77 of the second frame 12 by using a bolt 92.

A first protrusion 81 is integrally formed on a front surface of a front wall of the first storage portion 31. A second protrusion 82 is integrally formed on a rear surface of a rear wall. The first protrusion 81 is formed like a bracket, and arranged so as to protrude forward from a lower part of the first storage portion 31. As with the first protrusion 81, the second protrusion 82 is formed like the bracket, and arranged so as to protrude rearward from the first storage portion 31.

The first protrusion 81 and the second protrusion 82 are arranged in the lower part of the front wall or the rear wall of the first storage portion 31, and arranged in the left end where the first storage portion 31 is opened. Each of the first protrusion 81 and the second protrusion 82 has an insertion hole which penetrates in the left-right direction, respectively. By using each insertion hole, a first restricting part 45 of the restricting member 5 can be mounted to the first storage portion 31 with locking tools 95 and 96 which will be described later.

The second storage portion 32 with a hollow shape can store the tool casing (article) 9 made of cloth, for example, capable of storing an appropriate tool. The length of the second storage portion 32 in the front-back direction is longer than that in the vertical direction, in the side view. The longitudinal direction of the second storage portion 32 is inclined so as to rise as approaching the rear side (in other words, so as to approach the first storage portion 31), in the side view. The lower surface of the second storage portion 32 is arranged along the third frame 13, in the side view. As with the first storage portion 31, the left side of the second storage portion 32 is opened.

A second bracket 72 is integrally formed on the front surface of the front wall of the second storage portion 32. A third bracket 73 is integrally formed on the rear surface of the rear wall.

The second bracket 72 is arranged so as to protrude forward from the second storage portion 32. The second bracket 72 having the insertion hole which penetrates in the left-right direction can be fixed to the third stay 78 of the third frame 13 by using a bolt 93.

The third bracket 73 is arranged so as to protrude rearward from the second storage portion 32. The third bracket 73 having the insertion hole which penetrates in the left-right direction can be fixed to a fourth stay 79 of the third frame 13 by using a bolt 94.

Holding holes 85 which penetrate in the vertical direction are formed at the bottom of the second storage portion 32. The holding hole 85 is arranged in pairs in front and rear. Both of the holding holes 85 are arranged at the bottom of the second storage portion 32, especially in the left end where the second storage portion 32 is opened. The holding holes 85 can receive holding protrusions 87 included in the restricting member 5, which will be described later.

A hooking hole 86 is formed on the ceiling of the second storage portion 32. The hooking hole 86 is arranged at a front part of the ceiling of the second storage portion 32, and at the left end where the second storage portion 32 is opened. The hooking hole 86 can receive and fix a hooking claw 88 included in the restricting member 5, which will be described later.

The connecting portion 33 is configured as a wall part for connecting the first storage portion 31 and the second storage portion 32 in the vertical direction. As shown in FIG. 6, the connecting portion 33 includes the first coupling part 37 and the second coupling part 38.

The first coupling part 37 has a small plate-like shape, with its thickness oriented in the left-right direction. An upper end of the first coupling part 37 is connected to the first storage portion 31, and a lower end of the first coupling part 37 is connected to the second storage portion 32. The first coupling part 37 is arranged in the space between the first storage portion 31 and the second storage portion 32, especially at the rear end, and at the left end where the first storage portion 31 and the second storage portion 32 are opened.

The second coupling part 38 forms a gap between itself and the first coupling part 37 and connects the first storage portion 31 and the second storage portion 32. The second coupling part 38 is arranged forward of the first coupling part 37. The upper end of the second coupling part 38 is connected to the first storage portion 31. The lower end of the second coupling part 38 is connected to the second storage portion 32.

The second coupling part 38 has a L shape, in the plan view. The second coupling part 38 includes a first wall portion 39 and a second wall portion 40.

The first wall portion 39 has a plate shape, with its thickness direction facing in the front-back direction. The first wall portion 39 is arranged at a position away from the first coupling part 37 toward the front.

As shown in FIG. 5, the first wall portion 39 is arranged rearward of the front end of the first storage portion 31, and rearward of the front end of the second storage portion 32. Accordingly, as seen the storage member 4 as a whole, a recessed portion 29 that is recessed rearward in the side view, is formed on the front part of the storage member 4. As a result, the storage member 4 has a generally horizontal V shape, in the side view.

A recess 39a elongated in the left-right direction is formed in the lower part of the first wall portion 39. The recess 39a penetrates the first wall portion 39 in the front-back direction. The opened side (left side) of the recess 39a is same as the opened side of the first storage portion 31 and the second storage portion 32.

As shown in FIG. 6, the second wall portion 40 has a plate shape, with its thickness direction facing in the left-right direction. The second wall portion 40 has a longer side in the front-back direction than the side in the vertical direction, in the side view. The second wall portion 40 is arranged at a position away from the first coupling part 37, the position toward the direction approaching the air cleaner 6. The front end of the second wall portion 40 is integrally connected to the right end of the first wall portion 39. The rear end of the second wall portion 40 extends to the position in front of the front end of the first coupling part 37, in the side view.

A gap between the first storage portion 31 and the second storage portion 32 is separated by the second wall portion 40 and divided into two spaces in the left-right direction. In two spaces defined by such division, one space close to each opened side of the first storage portion 31 and the second storage portion 32 is an electric wire passing space 61 capable of passing electric wires 41, 42 and 43 in the front-back direction.

The left side (that is, the same side as each opened side of the first storage portion 31 and the second storage portion 32) of the electric wire passing space 61 is opened except for a portion where the first coupling part 37 exists. The electric wire passing space 61 is elongated in the front-back direction, and its front end is connected to the outside through the recess 39a. An opening 59 is formed between the rear end of the second wall portion 40 included in the second coupling part 38 and the first coupling part 37. The rear end of the electric wire passing space 61 is connected to the outside through the opening 59.

In the following, each of the electric wires 41, 42 and 43 will be described mainly with reference to FIG. 4 and FIG. 6. Each of the electric wires 41, 42 and 43 is configured as an elongated member with flexibility. In the electric wire passing space 61, each of the electric wires 41, 42 and 43 is oriented so as to be longer in the front-back direction than the vehicle left-right direction and the vertical direction.

The first electric wire 41 will be described. As described above, the battery 8 has the pair of front and rear electrodes. One end of the first electric wire 41 is connected to the front electrode, as shown in FIG. 4. The first electric wire 41 extends downward from the front electrode along the front surface of the battery 8. Then, the first electric wire 41 passes through the recess 39a that is formed in the first wall portion 39 and enters the electric wire passing space 61, as shown in FIG. 6. The first electric wire 41 extends rearward and passes through the opening 59, and thereby exits to the outside from the electric wire passing space 61. Accordingly, the first electric wire 41 is connected to a fuse box 63 that is arranged rearward of the battery 8, as shown in FIG. 4.

The second electric wire 42 will be described. As shown in FIG. 4, one end of the second electric wire 42 is connected to the fuse box 63. The second electric wire 42 extends forward from the fuse box 63, and enters the electric wire passing space 61 through the opening 59 shown in FIG. 6. The second electric wire 42 passes through the recess 39a that is formed in the first wall portion 39, and thereby exits to the outside from the electric wire passing space 61. The second electric wire 42 is further pulled forward and connected to an unillustrated electrical component (for example, a starter motor) that is arranged in front of the storage member 4.

The third electric wire 43 will be described. As shown in FIG. 4, one end of the third electric wire 43 is connected to the rear electrode of the battery 8. The third electric wire 43 extends downward from the rear electrode along the rear surface of the battery 8, and then enters the electric wire passing space 61 through the opening 59 shown in FIG. 6. The third electric wire 43 passes through the recess 39a that is formed in the first wall portion 39, and thereby exits to the outside from the electric wire passing space 61. The third electric wire 43 is further pulled forward and connected to an appropriate electric component that is arranged in front of the storage member 4.

One space of two spaces separated by the second wall portion 40 and divided into left and right is the above-described electric wire passing space 61. The other space is a harness passing space 62, as shown in FIG. 6. The harness passing space 62 is configured as a recessed groove that is elongated in the front-back direction, with its opened side close to the air cleaner 6. A main harness 44 which is a bundle of electric wires used for a signal wire of the motorcycle 1, is stored in the harness passing space 62.

In the above-described configuration, the battery 8 and the tool casing 9, the electric wires 41, 42 and 43, and the main harness 44 can be efficiently arranged in a narrow space. This can realize a compact layout of the motorcycle 1.

A plurality of ribs (not shown) elongated in the vertical direction are formed on a surface facing a side close to the air cleaner 6 in the second wall portion 40. Accordingly, rigidity of the second wall portion 40 can be increased.

Next, the restricting member 5 will be described. As shown in FIG. 5 etc., the restricting member 5 prevents the battery 8 and the tool casing 9 stored in the storage member 4 from falling off. The restricting member 5 can be removably mounted to the storage member 4 by using the locking tools 95 and 96.

The restricting member 5 is configured by integrally foilling the first restricting part 45, a second restricting part 46, and a connecting part 47, with synthetic resin as a material. The first restricting part 45 and the second restricting part 46 are arranged side by side in the vertical direction with a predetermined gap therebetween. The first restricting part 45 and the second restricting part 46 are connected by the connecting part 47.

The first restricting part 45 restricts so that the battery 8 does not come out from the first storage portion 31.

In the side view, the first restricting part 45 is elongated in the front-back direction. The length in the front-back direction of the first restricting part 45 is larger than the dimension in the front-back direction of the opening of the first storage portion 31. On the other hand, in the first restricting part 45, the length in the vertical direction is smaller than the dimension in the vertical direction of the opening of the first storage portion 31. Therefore, the first restricting part 45 is configured to cover only a part of the opening of the first storage portion 31 in the vertical direction, not the entire opening. This can reduce the weight of the first restricting part 45, and reduce the material cost.

The first restricting part 45 is configured to cover a part of the lower part of the opening of the first storage portion 31. This can realize reduction in size of the entire restricting member 5. The dimension of an internal space of the first storage portion 31 included in the storage member 4 is defined so that there is almost no margin with respect to the dimension of the battery 8. Therefore, in the state shown in FIG. 4, even if the battery 8 falls toward the left side about a contact portion with the first restricting part 45, its movement is restricted by the ceiling surface of the first storage portion 31. This can surely prevent the battery 8 from falling off.

As shown in FIG. 5, a third protrusion 83 is integrally formed in the front end of the first restricting part 45. A forth protrusion 84 is integrally formed in the rear end of the first restricting part 45. Each of the third protrusion 83 and the forth protrusion 84 has a bracket shape.

Each of the third protrusion 83 and the forth protrusion 84 has the insertion hole which penetrates in the left-right direction. The insertion holes receives the locking tools 95 and 96 for which the first restricting part 45 is mounted to the first storage portion 31.

Each of the locking tools 95 and 96 is configured as the well-known fastener clip with a deformable shaft portion. The fastener clip can be locked by pushing its head portion in a state where the shaft portion is inserted in the hole and thereby expanding the diameter of the shaft portion. The fastener clip can be also removed by pulling out the head portion and thereby releasing expansion of the diameter of the shaft portion. This can realize a configuration in which the restricting member 5 can be easily attached to or removed from the storage member 4.

The second restricting part 46 restricts so that the tool casing 9 does not come out from the second storage portion 32. The second restricting part 46 is arranged below the first restricting part 45. Unlike the first restricting part 45, the second restricting part 46 covers the entire opening of the second storage portion 32.

Hook-shaped holding protrusions 87 capable of inserting into the holding holes 85 of the second storage portion 32 are integrally formed in the second restricting part 46. The holding protrusion 87 is arranged in pairs in front and rear, corresponding to the holding holes 85. A snap-fit hooking claw 88 capable of inserting into the hooking hole 86 of the second storage portion 32 is integrally formed in the second restricting part 46. In this configuration, the holding protrusions 87 are inserted into the holding holes 85, and also the hooking claw 88 is inserted into the hooking hole 86. Thereby, the second restricting part 46 can be fixed so as not to come off from the second storage portion 32.

The connecting portion 47 connects the lower end of the first restricting part 45 and the upper end of the second restricting part 46 to each other. The connecting portion 47 is configured by a plurality of ribs extending in the vertical direction. The connecting portion 47 is arranged so as to cover at least a part of the opened side of the electric wire passing space 61 included in the storage member 4, in a state where the restricting member 5 is mounted to the storage member 4. This can restrict a path of the electric wires 41, 42 and 43 for passing through the electric wire passing space 61, and prevent the electric wires 41, 42 and 43 from being exposed from the electric wire passing space 61.

The connecting portion 47 is arranged rearward of the front end of the first restricting part 45, and rearward of the front end of the second restricting part 46. Accordingly, as entirely seen the restricting member 5, a recess with a shape corresponding to the recessed portion 29 of the storage member 4 is formed in the front part of the restricting member 5. Accordingly, when the restricting member 5 is mounted to the storage member 4, the recessed portion 29 having an opened front side is not substantially closed.

As shown in FIG. 5 etc., a penetrating lightening hole for reducing the weight is appropriately formed in the first restricting part 45 and the connecting portion 47. On the other hand, the second restricting part 46 does not have such lightening hole, in order to prevent small tools and the like from coming out toward the outside through the hole.

In the above-described configuration, adjustment work of the initial load of spring 53 of suspension 7 will be described. As shown by a chain line in FIG. 4, an operator performs operation of hooking the wrench 58 in a notch of the rotating member 55 included in the suspension 7 and turning it. This can rotate the rotating member 55. Although the vehicle body frame 3 is not shown in FIG. 4, it is necessary that the wrench 58 is inserted from the side into the internal space surrounded by the first frame 11, the second frame 12, and the third frame 13. Therefore, it is difficult to secure a space for turning the wrench 58. In this respect, in this embodiment, since the recessed portion 29 of the storage member 4 faces an outer periphery of the rotating member 55, a turning stroke of the wrench 58 can be largely secured by the recessed portion 29, as shown by an outlined arrow in FIG. 4. As a result, a configuration in which the storage member 4 hardly disturbs the above-described adjustment work can be realized while arranging the storage member 4 close to suspension 7 and efficiently utilizing the space.

Next, one example of an operation of taking out the tool casing 9 stored in the second storage portion 32 of the storage member 4 will be described. Firstly, the operator removes the left side cover 68 by using an appropriate tool. Accordingly, the storage member 4 and the restricting member 5 can be entirely exposed. Next, the operator removes the locking tool 95 from the first protrusion 81 and the third protrusion 83, and then removes the locking tool 96 from the second protrusion 82 and the forth protrusion 84. Thereafter, the operator removes the restricting member 5 from the storage member 4 by pulling the restricting member 5 toward the left. At this time, the restricting member 5 is slightly strongly pulled, and thereby the hooking claw 88 comes out of the hooking hole 86. Accordingly, the first storage portion 31 and the second storage portion 32 are opened, and thereby the tool casing 9 stored in the second storage portion 32 can be taken out.

In a state where the restricting member 5 is removed from the storage member 4, not only the second storage portion 32 but also the first storage portion 31 are opened. Therefore, maintenance work such as replacement of the battery 8 can be performed as well.

As described above, the motorcycle 1 of this embodiment includes the first frame 11, the second frame 12, the third frame 13, and the storage member 4. The second frame 12 is connected to the first frame 11, and extends rearward from a connecting position between the second frame 12 and the first frame 11. The third frame 13 is connected to the first frame 11 at a position lower than the connecting position between the second frame 12 and the first frame 11, extends rearward from the connecting position between the third frame 13 and the first frame 11, and then connected to the second frame 12. The storage member 4 is fixed to at least one of the first frame 11, the second frame 12, and the third frame 13. The seat 23 on which the driver sits, is fixed to the second frame 12. The storage member 4 includes the first storage portion 31 and the second storage portion 32. The first storage portion 31 can store the battery 8. The second storage portion 32 is positioned below the first storage portion 31, and can store an article other than the battery 8. In the side view, the first storage portion 31 and the second storage portion 32 are arranged in the internal area surrounded by the first frame 11, the second frame 12, and the third frame 13. The first storage portion 31 and the second storage portion 32 are arranged side by side in the vertical direction.

Accordingly, the first storage portion 31 for storing the battery 8 and the second storage portion 32 for storing the tool casing 9 are compactly arranged, which can utilize the internal space of the vehicle body frame 3 (the first frame 11, the second frame 12, and the third frame 13). Since the first storage portion 31 and the second storage portion 32 are integrated in the storage member 4, they can be easily attached to the vehicle body frame 3.

In the motorcycle 1 of this embodiment, the storage member 4 includes the first coupling part 37 and the second coupling part 38, which are integrally formed so as to connect the first storage portion 31 and the second storage portion 32. Each of the first coupling part 37 and the second coupling part 38 is arranged in the space between the first storage portion 31 and the second storage portion 32, spaced from each other.

Accordingly, the first storage portion 31 and the second storage portion 32 can be connected to each other with a simple configuration. The rigidity of the storage member 4 can be also improved.

In the motorcycle 1 of this embodiment, the electric wires 41, 42 and 43 as the members in which its length in the front-back direction is longer than the length in the vehicle left-right direction and the vertical direction, pass through the space between the first storage portion 31 and the second storage portion 32 in the front-back direction.

Accordingly, the space can be effectively utilized.

In the motorcycle 1 of this embodiment, the first coupling part 37 is arranged at one side in left or right of the electric wires 41, 42 and 43. The second coupling part 38 is arranged at the other side in left or right of the electric wires 41, 42 and 43.

Accordingly, the path through which the electric wire 41 is passed can be guided by the first coupling part 37 and the second coupling part 38. Since the first coupling part 37 and the second coupling part 38 are dividedly arranged in left and right, the rigidity can be further improved.

The motorcycle 1 of this embodiment includes the restricting member 5 capable of attaching to or removing from the storage member 4. The restricting member 5 includes the first restricting part 45 and the second restricting part 46. The first restricting part 45 restricts so that the battery 8 does not come out from the first storage portion 31. The second restricting part 46 restricts so that the tool casing 9 does not come out from the second storage portion 32. The first restricting part 45 and the second restricting part 46 are integrally formed therewith.

This can prevent the battery 8 and the like stored in the storage member 4 from falling off. Since the plurality of restricting pars are integrally formed in the restricting member 5, the number of parts can be reduced.

In the motorcycle 1 of this embodiment, one side in left or right of the first storage portion 31 is opened. The opened side of the second storage portion 32 is same as that of the first storage portion 31. The first restricting part 45 closes at least a part of the opened side of the first storage portion 31. The second restricting part 46 closes the entire opened side of the second storage portion 32.

Accordingly, since both of the first storage portion 31 and the second storage portion 32 can be accessed from the common side, the operation such as taking in and out of contents can be easily performed. Since the same opened side of two storage portions is closed, the configuration of the restricting member 5 can be simplified.

In the motorcycle 1 of this embodiment, the first restricting part 45 closes a part of the lower opened portion of the first storage portion 31. The second restricting part 46 closes the entire opened portion of the second storage portion 32.

Accordingly, the first restricting part 45 which prevents the battery 8 from falling off does not close all of the opened portion of the first storage portion 31, and partly closes the lower opened portion close to the second storage portion 32. This can reduce the size and weight of the restricting member 5. On the other hand, the second restricting part 46 closes the entire opened portion of the second storage portion 32. Therefore, for example, when an elongated article is stored in the second storage portion 32, it is possible to prevent such article from partially protruding or falling outward from the second restricting part 46.

The motorcycle 1 of this embodiment includes the suspension 7. The suspension 7 includes the spring 53 and the rotating member 55. The rotating member 55 adjusts the load of the spring 53 by rotating. In the side view, at least a part of the rotating member 55 is arranged in the internal space surrounded by the first frame 11, the second frame 12 and the third frame 13. In the storage member 4, the recessed portion 29 which is recessed rearward is formed between the first storage portion 31 and the second storage portion 32. The recessed portion 29 is arranged to face a part of the outer periphery of the rotating member 55.

Accordingly, the rotating member 55 is rotated so that the recessed portion 29 receives the wrench 58, for example, without removing the storage member 4. This can adjust the load of the spring 53 included in the suspension 7. Therefore, workability is improved.

In the motorcycle 1 of this embodiment, the air cleaner 6 is arranged at a position corresponding to the storage member 4 in the left-right direction.

Accordingly, the air cleaner 6, the first storage portion 31 and the second storage portion 32 can be effectively arranged in a limited space.

While a preferred embodiment of the present invention has been described above, the above-described configuration can be modified, for example, as follows.

Each opening of the first storage portion 31 and the second storage portion 32 may be oriented in the same direction and may be oriented forward or rearward.

The configuration of the storage member 4 is not limited to that in which the storage member 4 is fixed to the second frame 12 and the third frame 13. That is, the storage member 4 is fixed to at least one of the first frame 11, the second frame 12, and the third frame 13. Any method of which the storage member 4 is fixed to the vehicle body frame 3 is acceptable. The storage member 4 can be fixed to the vehicle body frame 3 by using members other than the bolts 91 to 94, for example.

The number, position, shape, and the like of the coupling parts including the connecting portion 33 are not limited to those shown in FIG. 6, and can be appropriately changed.

The shape of the recess 39a formed in the first wall portion 39 of the second coupling part 38 is not particularly limited as long as the electric wires 41, 42 and 43 can pass through the recess 39a.

Instead of, or in addition to the space between the first storage portion 31 and the second storage portion 32, such space can be configured that the elongated member such as a pipe can pass through the space.

The first restricting part 45 of the restricting member 5 may be configured to cover the entire opening of the first storage portion 31. The second restricting part 46 may be configured to cover only a part of the opening of the second storage portion 32 (for example, only a part of the lower portion). That is, it is acceptable that the first restricting part 45 and the second restricting part 46 close at least a part of each opened portion of the first storage portion 31 or the second storage portion 32.

The configuration of the suspension 7 can have the configuration in which the rotating member 55 is threadedly connected to the suspension 7 and axially moved toward the axial direction by screw feeding accompanying rotation and thereby the initial load is changed, instead of the configuration of which the initial load is changed by the adjusting gear formed in the cylindrical member 56.

Each configuration of the locking tools 95 and 96 is not particularly limited as long as the restricting member 5 can be attached to or removed from the storage member 4. For example, instead of the above-described fastener clip, the bolt can be used.

The wrench 58 may be or may not be stored in the second storage portion 32 as an on-vehicle tool. Instead of the tool casing 9, other articles other than the battery 8 may be stored in the second storage portion 32.

The storage member 4 may be arranged in the right side of the vehicle body by horizontally inverting a positional relationship between the storage member 4 and the air cleaner 6. In this case, any configuration is acceptable as long as the first storage portion 31 and the second storage portion 32 can be accessed by removing the right side cover 68.

The present invention can be applied not only to the motorcycle 1 for travelling an unleveled ground shown in FIG. 1, but also to other type of motorcycles. The present invention can also be applied not only to the motorcycles but also to three-wheeled or four-wheeled buggy vehicles and water bikes (personal watercraft).

What is claimed is:

1. A saddle vehicle, comprising;
   a frame; and
   a storage member fixed to the frame,
   wherein the storage member includes a first storage portion capable of storing a battery, and a second storage portion capable of storing an article other than the battery, the second storage portion being positioned below the first storage portion in a vertical direction,
   wherein in a side view, the first storage portion and the second storage portion are arranged in an internal space surrounded by the frame,
   wherein the storage member includes a plurality of coupling parts which are integrally formed so as to connect the first storage portion and the second storage portion and wherein each of the coupling parts is arranged in a space between the first storage portion and the second storage portion, spaced from each other, and
   wherein a member in which its length in a front-back direction is longer than the length in a vehicle left-right direction and the vertical direction, passes through the space between the first storage portion and the second storage portion in the front-back direction.

2. The saddle vehicle according to claim 1, wherein at least one of the plurality of coupling parts is arranged at one side left or right of the member and wherein the other coupling parts are arranged at the other side left or right of the member.

3. The saddle vehicle according to claim 1, wherein the first storage portion has an opened side, the second storage portion has an opened side, and the opened side of the first storage portion and the opened side of the second storage portion are oriented in the same direction.

4. The saddle vehicle according to claim 3, further comprising:
   a restricting member capable of attaching to or removing from the storage member,
   wherein the restricting member includes a first restricting part for restricting so that the battery does not come out from the first storage portion, and a second restricting part for restricting so that the article does not come out from the second storage portion and
   wherein the first restricting part and the second restricting part are integrally formed.

5. The saddle vehicle according to claim 4, wherein the first restricting part closes at least a part of the opened side of the first storage portion, and wherein the second restricting part closes at least a part of the opened side of the second storage portion.

6. The saddle vehicle according to claim 5, wherein the first restricting part partly closes a lower portion of the opened side of the first storage portion and wherein the second restricting part closes the entire opened side of the second storage portion.

7. The saddle vehicle according to claim 3, wherein the opened side of the first storage portion and the opened side of the second storage portion are orientated leftward, rightward, forward or rearward.

8. The saddle vehicle according to claim 7, wherein the opened side of the first storage portion and the opened side of the second storage portion are orientated leftward or rightward and the length of the second storage portion in a front-back direction is longer than the length of the second storage portion in the vertical direction.

9. The saddle vehicle according to claim 8, wherein the battery is substantially rectangular, the length of the battery in the front-back direction being longer than the length of the battery in left-right direction.

10. The saddle vehicle according to claim 1, wherein an air cleaner is arranged at a position corresponding to the storage member in the left-right direction.

11. The saddle vehicle according to claim 1, wherein the frame includes:
   a first frame;
   a second frame connected to the first frame, the second frame extending rearward from a connecting position between the second frame and the first frame; and
   a third frame connected to the first frame at a position lower than the connecting position between the second frame and the first frame, the third frame extending rearward from the connecting position between the third frame and the first frame, the third frame then connected to the second frame.

12. The saddle vehicle according to claim 1, further comprising:
   a seat on which a driver sits fixed to the frame.

13. A saddle vehicle, comprising:
   a frame;
   a storage member fixed to the frame; and
   a suspension,
   wherein the suspension includes a spring and a rotating member for adjusting a load of the spring by rotating,
   wherein the storage member includes a first storage portion capable of storing a battery, and a second storage portion capable of storing an article other than the battery, the second storage portion being positioned below the first storage portion in a vertical direction,
   wherein in a side view, the first storage portion and the second storage portion are arranged in an internal space surrounded by the frame,
   wherein in the side view, at least a part of the rotating member is arranged in the internal space surrounded by the frame,
   wherein the storage member has a recessed portion that is recessed rearward between the first storage portion and the second storage portion, and
   wherein the recessed portion is arranged to face a part of an outer periphery of the rotating member.

14. A storage member of a saddle vehicle, comprising:
   a first storage portion capable of storing a battery; and
   a second storage portion capable of storing an article other than the battery, the second storage portion being positioned below the first storage portion in a vertical direction,
   wherein the first storage portion has an opened side, the second storage portion having an opened side, the opened side of the first storage portion and the opened side of the second storage portion being oriented in the same direction,
   wherein the storage member includes a plurality of coupling parts which are integrally formed so as to connect the first storage portion and the second storage portion and wherein each of the coupling parts is arranged in a space between the first storage portion and the second storage portion, spaced from each other, and
   wherein a member in which its length in a front-back direction is longer than the length in a vehicle left-right direction and the vertical direction, passes through the space between the first storage portion and the second storage portion in the front-back direction, and
   wherein the storage member is fixed to a frame of the saddle vehicle.

* * * * *